May 23, 1967 G. B. PARRENT, JR., ET AL 3,320,852
OPTICAL PATTERN REPETITION
Filed Dec. 28, 1964 3 Sheets-Sheet 1
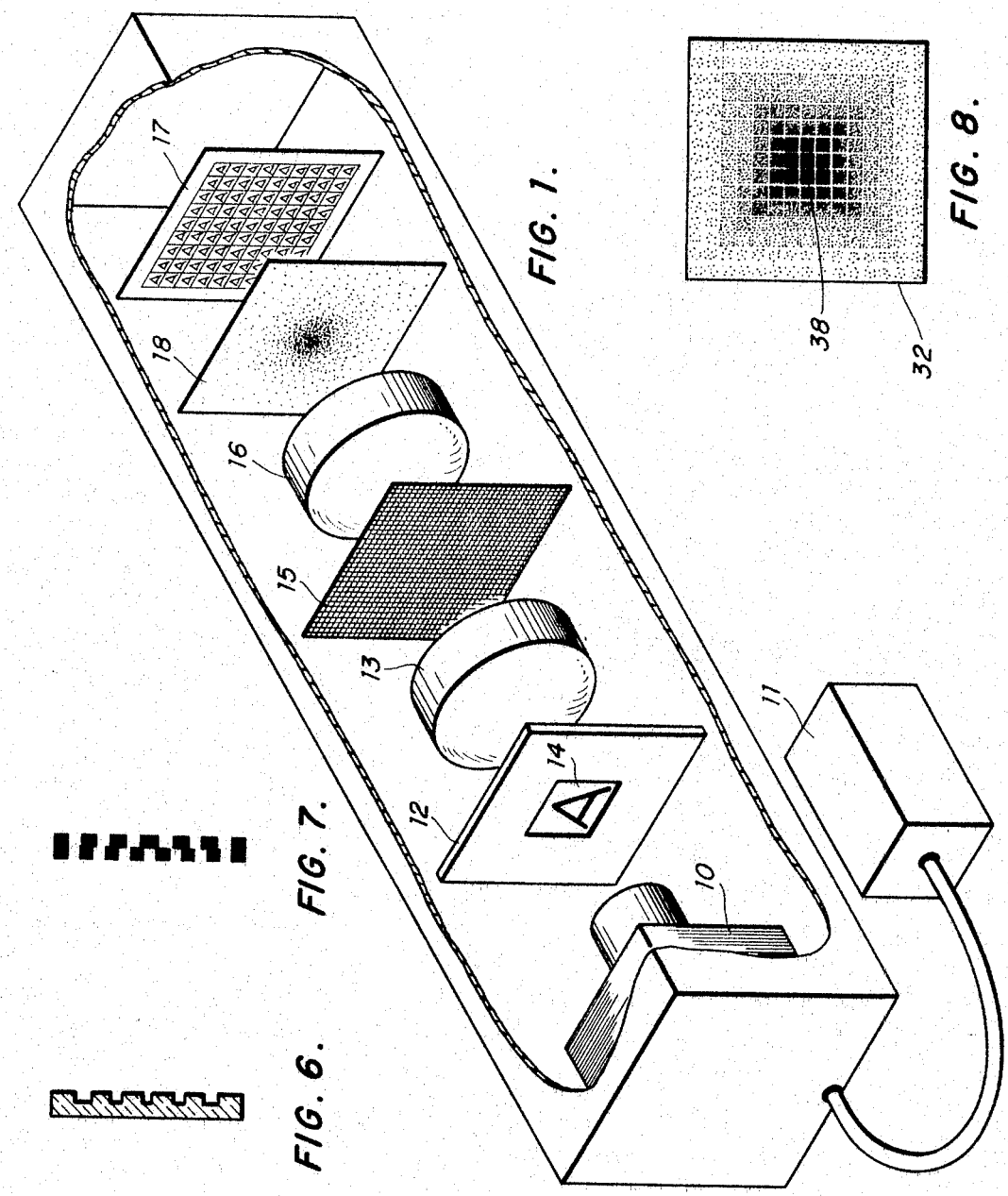
INVENTORS
GEORGE B. PARRENT, Jr.
BRIAN J. THOMPSON
BY 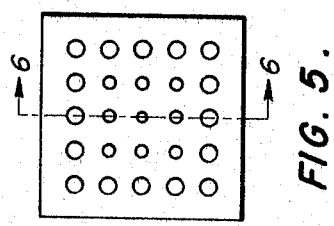
ATTORNEYS INVENTORS
GEORGE B. PARRENT, Jr.
BRIAN J. THOMPSON
ATTORNEYS INVENTORS
GEORGE B. PARRENT, Jr.
BRIAN J. THOMPSON
BY
ATTORNEYS

United States Patent Office 3,320,852
Patented May 23, 1967

3,320,852
OPTICAL PATTERN REPETITION
George B. Parrent, Jr., Carlisle, and Brian J. Thompson, Chelmsford, Mass., assignors to Technical Operations, Incorporated, Burlington, Mass., a corporation of Massachusetts
Filed Dec. 28, 1964, Ser. No. 421,176
14 Claims. (Cl. 88—24)

The invention relates to pattern repetition and in particular to optical multiplication of images.

Early methods of repeating an identical pattern were by hand, using stamps, stencils or similar devices. Today, masks for mass production etching of solid state devices, half tone screens, and stencils for controlling automated machinery, have raised the accuracy requirements for pattern repetition to the extreme capabilities of modern technology. The earlier processes have been carried to a high level of mechanized accuracy in the "step and repeat" machines of today using photographic processes and automatically aligning themselves in repeat positions with accuracies to plus or minus .001 of an inch and better. Optical multiplication has been carried to a high degree of positional accuracy using "fly's eye" optics.

The "step and repeat" machines are expensive and limited by the mechanical accuracy available with moving parts. "Fly's eye" lenses are extremely expensive and difficult to produce with high optical quality.

Now in accordance with the present invention it has been found that diffraction techniques using quasi-monochromatic light provide means for accurately multiplying an optical image with relatively simple and inexpensive equipment. Recent advances in high intensity quasi-monochromatic light sources have awakened new interest in the manipulation of light signals by diffraction techniques. Such manipulation of light is in many ways comparable to the manipulation of electrical signals by electronic circuits. An example of this is the optical demodulation of spots that are frequency modulated in their spacing as disclosed in U.S. Patent No. 3,108,383. However the many similarities are confused and obscured by conventional use of "rays" to explain the behavior of light instead of "waves." Further confusion is added by the tendency to think in terms of images rather than amplitude, phase and frequency modulation. As a result, the use of diffraction techniques for the manipulation of light signals is still in its infancy. In the present invention, light modulated by the pattern to be multiplied is further modulated by a diffraction grating and a transformation of the two produces the repeated pattern. Thus it is an object of the present invention to define an optical system for repeating a single image through diffraction techniques.

Further objects and features of the invention will be understood upon reading the following description together with drawings in which:

FIG. 1 is a diagrammatic illustration of a complete image multiplying system in accordance with the present invention;

FIG. 5 is a plane view of one embodiment of a diffraction grating in accordance with the invention;

FIG. 6 is an enlarged cross-section of a segment of a second embodiment of the diffraction grating in accordance with the invention;

FIG. 7 is a cross-section of a third embodiment of a diffraction grating; and

FIG. 8 is a plane view of a final filter in accordance with the invention.

Figure 2:
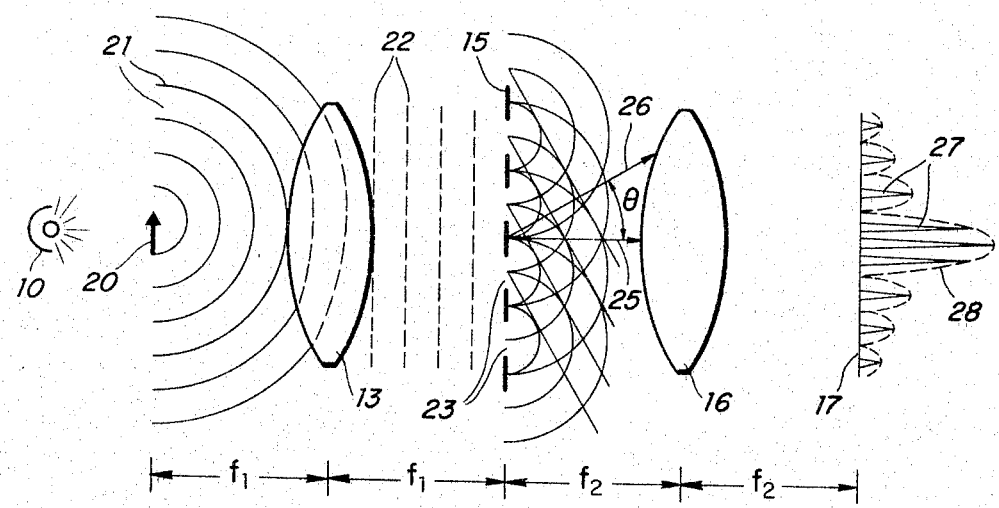
FIG. 2 is an explanatory diagram to illustrate the operation of the invention.

In the present invention a single pattern in an object plane is illuminated and imaged in an image plane where it appears multiply repeated in a one or two dimensional area as desired. Optical apparatus for achieving this is illustrated diagrammatically in FIG. 1. The apparatus includes a quasi-monochromatic radiation source 10. As used herein, quasi-monochromatic radiation is defined as radiation which produces a diffraction pattern that appears to be the same "as though the radiation were perfectly monochromatic." Interpreting this definition in terms of system geometry we can say that $C/\Delta \nu$ must be less than the maximum difference between path lengths in the optical system, where C is the velocity of light in centimeters per second and $\Delta \nu$ is the spectral width of the source at the half power points in seconds$^{-1}$. For most practical systems this will limit the spectral width at the primary output frequency to something less than 50 angstroms at the half power points. Narrowing the spectral width improves resolution up to the point where the quality of lens elements becomes the overriding factor. Radiation source 10 is operated by power source 11. For this purpose lasers, arc lamps, sodium vapor lamps and the like are suitable. Light sources that have outputs of significant intensity at wave lengths widely separated from the primary output frequency of the lamp should be filtered to block out such other frequencies. The additional diffraction orders produced by a plurality of light wave lengths will result in undesirable ghosting effects in the final images. Coherent light is usable but unnecessary.

A pattern to be multiply imaged is supported in an object support frame 12 arranged to receive light from source 10. The apparatus illustrated in FIG. 1 is designed to receive object patterns as transparencies. However, it should be understood that the object pattern can be opaque and used to reflect light diffusely or specularly in accordance with particular requirements. Frame 12 contains an aperture 14 for stopping nonimage light. This aperture is smaller than the optical aperture of the lenses and becomes a part of the object pattern. Preferably aperture 14 is adjustable so that it can frame the object closely with different object sizes.

The light as modified by the object pattern is collected by a lens system 13. The lens system will normally include several lens elements for corrective purposes in order to maintain quality. However, it need have only the light converging characteristics necessary to operate within the space available.

An array 15 of periodic optical variations is positioned following lens system 13 in the optical path. Such an array is conventionally called a diffraction grating. As used herein, a diffraction grating is defined as any arrangement which imposes on an incident wave a periodic variation of phase or amplitude or both. Specific embodiments of this array will be described in connection with FIGS. 4 through 7. The array in FIG. 1 is depicated as a ruled glass grating in which closely spaced rulings are cut parallel to both dimensions of the glass plate to provide a two dimensional array. Array 15 should be large enough to cover the area of the optical pattern as determined by the apertures of the lens system preceding and following it. A second lens system 16 follows array 15 in the optical path and brings the image to a focus at the image plane. A display screen 17 is illustrated occupying the image plane in the apparatus of FIG. 1. However, for purpose of utilization, means for supporting a photographic film or other sensitized material could also be positioned in the image plane.

Without compensation, the central image or images would be much brighter than images successively spaced out from the center of the image plane. One type of correction for this is illustrated in FIG. 1 as filter screen 18. This screen is suitably placed immediately adjacent to the image plane and approaches opacity in the center while getting progressively more transparent with distance from the center. The desired correction is not linear and its actual nature will be discussed further in connection with FIGS. 2 and 4.

The particular position of array 15 between lens system 13 and lens system 16 is not critical. However, positioning it as late in the system as posible, i.e. immediately adjacent to second lens system 16, makes the best use of available light. The object pattern support 12 is preferably positioned spaced from lens system 13 by the focal length of first lens system 13. With the object pattern in this position, moving array 15 back and forth between the two lens systems has no significant noticeable effect on the image with the exception of minor variations in intensity and resolution. Moving the object pattern support 12 away from the principal focus of lens system 13 produces magnification in the image. Also if the object pattern holder 12 is out of the plane of the principal focus, movement of array 15 will change the separation between the multiple images at the image plane.

The second lens system 16 is preferably spaced from the first lens system 13 by minimum distance. In this position the second optical system 16 operates at its highest efficiency with the least loss of light.

The operation of the invention is most readily explainable by describing it with the object pattern and the diffraction grating spaced from the first optical system 13 on opposite sides by the focal length of the system. For this explanation, second optical system 16 is arranged so that the grating and the image plane are spaced from it on opposite sides by the focal length of the second optical system.

Under these conditions the Fourier transform of the amplitude distribution of the object pattern will appear at the grating plane. The second optical system provides the transform of the product of the grating and the first transform. Since the transform of a product is the convolution of the transform, resultant distribution is the object distribution convolved with the transform of the grating.

This is easily explained by following the path of the light waves through the system. FIG. 2 is a diagrammatic sketch of the system for this explanation. As in FIG. 1, quasi-monochromatic light source 10 illuminates object 20 conventionally depicted as an arrow. This object is spaced from a converging lens 13 by the focal length, $f_1$, of the lens. With the object so located at the principal focus of the lens, the light waves are refracted by the lens so that they are parallel and no image will be formed without a further converging device.

For simplicity, light waves 21 are illustrated as emanating from one point of object 20. Light from this one point strikes every part of lens 13. Since all of this light will be refracted by lens 13, it follows that every part of the collimated wave front 22 leaving lens 13 will be representative of this point. The same will hold true for light emanating from every other point of object 12. Thus the complex wave front propagating from lens 13 will be representative of each and every point of object 20 at each and every point along the complex front. This is readily demonstrable. If a person places his eye at any point in a plane back of and parallel with lens 13 and within its aperture, he will be able to observe the object.

A diffraction grating 15 is positioned in the optical path spaced from lens 13 by the focal length $f_1$. This grating for simplicity consists of an opaque plate containing a series of slit apertures 23 perpendicular to the plane of the drawing. It can be understood from the above discussion that each one of these apertures "sees" the entire object and that the portion of the complex wave front intercepted by any one aperture is representative of the entire object.

In accordance with Huygen's principle, each aperture in grating 15 becomes a new center of disturbance from which emanates a separate system of waves. As the system of waves from the various apertures meet crest on trough destructive interference occurs and where they meet crest on crest reinforcement will occur. The result of this is a series of new wave fronts each series propagating in a unique direction.

Referring to FIG. 2 it will be noted that one of the new wave fronts in the figure is propagated in the original direction as indicated by arrow 25. This wave front is conventionally designated as the zero diffraction order and propagates in a direction normal to the grating. The higher orders of diffraction propagate at successively larger angles, $\theta$, from the normal to the grating. Thus the wavefronts representing the first secondary diffraction maximum are designated as the first diffraction order and exist as two or more wavefronts symmetrically displaced about the zero order wavefront. One of the first order wavefronts is illustrated by arrow 26 in FIG. 2. It will be noted that each wavefront contains energy from each of the apertures.

It is not necessary to explain the operation with the entire image illuminating the grating since each component part of the resulting complex waveform will operate similarly to the simple waveform described above with complex wavefronts propagating in the identical directions as the simple one. Each complex wavefront will represent the original image and each will come to a focus in the same image plane displaced in position in accordance with the angle $\theta$ of its diffraction order.

With grating 15 at the principal plane of focus of second lens 16 as illustrated in FIG. 2, the grating itself will be focused at infinity. Object 20 on the other hand was focused at infinity by lens 13 and is so seen by lens 16. Accordingly lens 16 brings object 20 to a focus in an image plane positioned one focal length away from lens 16.

Again note that the particular spacings stated for FIG. 2 are for simplicity of explanation and are not essential to the operation of the invention.

If the operation of the described optical system faithfully followed Huygen's basic principle, then the inventive system would be quite simple and further explanation would be unnecessary. However the system as described in FIG. 2 produces unacceptable variations in image intensity at the image plane. This is graphically illustrated in FIG. 2 by curve 27 representing the intensity amplitude of the grating diffraction orders at the image plane. Curve 28 represents the limiting envelope of curve 27.

The various maxima of curve 27 are at the locations where the multiple images of the object will appear. As can be seen, the amplitude of these maxima fall off irregularly with higher diffraction orders. The intensity of the images varies in the same irregular fashion. This can be described as gross variations in intensity as compared to imagewise intensity variations.

Limiting envelope 28 follows a curve determined by the dimensions of the apertures or discontinuities in grating 15. In order to understand the reason for envelope 28, it is necessary to consider each aperture or discontinuity in grating 15 as being occupied by two or more wave sources producing additional destructive and reinforcing interferences. It is these interferences that produce the nulls in envelope 28. Since all interferences produced are completely effective provided the parameters producing the interferences are repeated with each contributing energy source (i.e. each aperture), each interference is a limiting interference. Accordingly, curve 27 is properly considered as a limit on curve 28 as well as curve 28 being a limit on curve 27. Thus no energy reaches the image plane except in areas coinciding within both curves.

Analysis shows that as the center to center spacing of the discontinuities in grating 15 is increased, the diffraction orders as represented by curve 27 squeeze closer together. Examination of FIG. 2 should make it evident that increasing the center to center spacing of apertures 23 will alter the propagation path 26 by making angle θ smaller. Since causing angle θ to decrease will not make the image patterns smaller, at some small angle θ, they will overlap. Thus the period of the grating can be selected to prevent overlap in the images. Also as each grating aperture size increases the envelope maxima as represented by curve 28 squeeze closer together. Advantages can be derived from this and optimum arrangements will be described in connection with FIG. 4 through FIG. 8.

Figure 3:
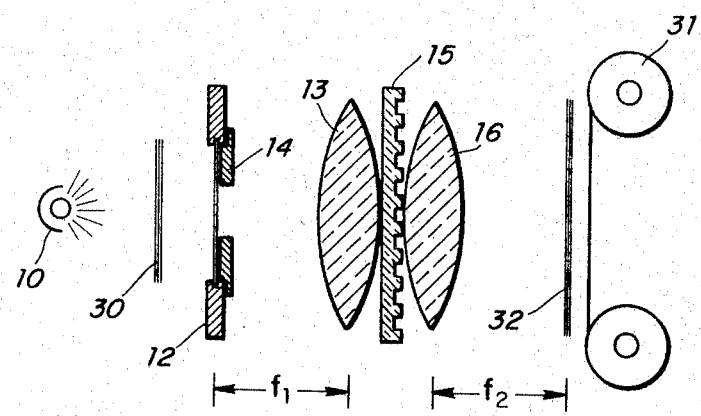
FIG. 3 is a diagrammatic illustration of a preferred optical arrangement for the system of FIG. 1.

FIG. 3 illustrates a preferred arrangement for the optical system in accordance with the invention. In FIG. 3 the light from source 10 is filtered by an interference filter 30 to obtain as nearly monochromatic light as possible. The object is supported by object frame 12 in the plane of principal focus of collimating lens 13. This arrangement flattens the wavefront leaving lens 13 so that the spacing of the following element becomes noncritical. Then to conserve space and eliminate light losses in the medium (i.e. air), diffraction grating 15 is positioned immediately adjacent to lens 13.

Grating 15 is depicted as a phase grating since this produces a slight increase in intensity over the amplitude gratings. Lens 16 is positioned immediately adjacent to grating 15 in order to intercept the maximum amount of light leaving grating 15. Since the grating produces wavefronts propagating in diverging directions, there will be light loss to the extent of distance between the grating and the lens due both to divergence and to the medium. A photosensitive imaging surface 31 is positioned in the plane of principal focus of lens 16. In front of the imaging surface, final filter 32 is positioned. This filter is placed as close as practical to the photosensitive surface so that the image is substantially in focus when modified by the filter. Preferred embodiments of grating 15 and filter 32 are described below.

Figure 4:
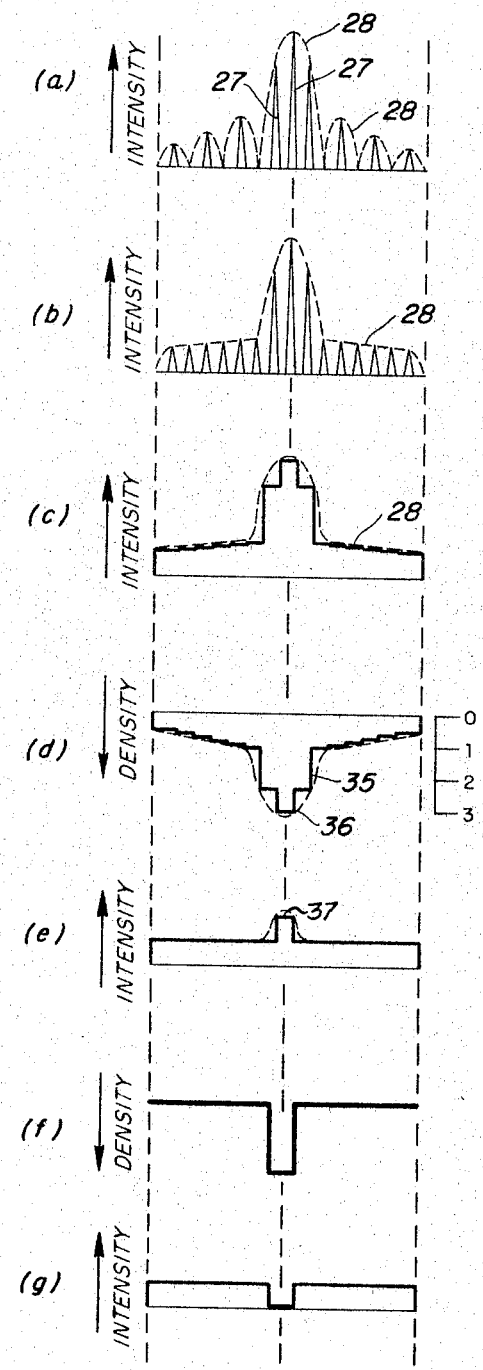
FIG. 4 is a graphical representation to demonstrate amplitude correction for the grating diffraction pattern.

FIG. 4 is a series of graphical representations illustrating the intensity variation problems of the present system and a preferred means of compensation. Graph (a) of FIG. 4 illustrates the problem and will be recognized as the same set of curves 27 and 28 represented at the image plane in FIG. 2. Graph (a) represents a diffraction pattern produced by a grating containing periodically positioned identical apertures illuminated by a point source at infinity. Curve 28 is the amplitude of a diffraction pattern that would be produced by a single aperture of the size used in the grating. With the addition of more identical apertures periodically spaced, the intensity pattern represented by curve 28 ceases to exist as such, but continues as a limit on the diffractions produced by the periodic apertures.

Thus in graph (a) the second diffraction order of the grating has been represented as falling at the null between the zero and first order of the single aperture and does not appear. With aperture dimensions and spacings that will give the intensity amplitude of graph (a), the second and all following even orders of the grating diffraction are lost. Other dimensions and spacings will produce severe fluctuations in intensity between image orders.

Since the spacing between the orders of curve 28 will vary inversely with the size of the apertures along the same dimension, and the spacing between the orders of curve 27 will vary inversely with the center to center spacing of the aptreures along the same dimension, the aperture size and spacing can be selected to compensate somewhat for intensity fluctuations in the image orders. For example, selecting sizes and spacings to produce the exact results illustrated by graph (a) would enable ready utilization of just the odd image orders. Since these occur at peaks in the high orders of curve 28 with a fairly linear fall off in amplitude, compensation with a tapered filter would not be difficult.

A preferred method of correcting for fluctuations in intensity of the image orders is graphically illustrated in graphs (b) through (g) of FIG. 4. Curve 28 is modified in graph (b) removing the null points. This is accomplished by a grating of periodic dimensionally-dissimilar optical variations. As used herein, periodic means occurring at regular intervals or having the same center to center spacing. Dimensionally dissimilar is defined as dissimilar in size or shape so that the dimension of the variations in any one direction changes from one variation to another. One example of this is seen in FIG. 5 which illustrates a grating of circular apertures in a two dimensional array. While the apertures in this grating are illustrated as small in the center and increasing going out from the center, this order can be reversed or a completely random distribution of sizes will have the same result. What occurs is that the destructive and reinforcing interferences related to given aperture dimensions are averaged out raising the valleys and lowering the peaks of curve 28. The contributions to the zero order are affected very little by this so the central maximum remains relatively high. It can be seen that the grating diffraction lost at the null points of graph (a), are up on a level corresponding with the other diffraction orders in graph (b).

Diffraction grating 15 may take any one of many forms. It must contain periodic optical variations. These variations may be discontinuities such as physical apertures or they may be of a continuous nature such as sinusoidal variations. The variations and hence the period must be large with respect to the wavelength of light used. The term optical variations as used herein denotes variations in transparency, variations in thickness or refractive index as in a phase grating, or actual physical apertures in an opaque or transparent screen.

The number of variations must be two or more and the dimension between the extreme variations is preferably at least the effective aperture of the optical system at the position of the grating. Operating within the limits imposed by the effective aperture of the system, increasing the dimension between the extreme variations will improve resolution. If the variations are apertures in an opaque screen, increasing the size and number of the apertures will increase the intensity of the images.

FIG. 5 represents an opaque screen having periodic dimensionally-dissimilar circular apertures. These apertures may be either transparent areas or physical holes. FIG. 6 is a cross-section of a phase grating having a plane pattern similar to that of FIG. 5. For maximum energy in the higher orders of diffraction, the discontinuities in the grating should advance or retard the phase of the particular light frequency used by ½ wavelength.

FIG. 7 is a cross-section of a third grating embodiment in which dissimilarities in the size of the discontinuities is accomplished by superimposing to gratings having slightly different periods. In such a composite grating it is preferred to select the grating periods so that the cycle of superimposed variations to 180° displaced variations is not repeated within the aperture of the system. Such repetition would produce moiré effects.

The larger number of dissimilarities in size of the optical variations the better within reasonable limits. However, the maximum and minimum sizes are restricted by the wavelength of the light used. Thus in an intensity controlled grating, the smallest aperture dimension must be large compared to the wavelength and the largest aperture dimension must be small compared to the grating period. Similar restrictions apply to phase gratings.

While the gratings described have been generally two dimensional arrays, a one dimensional array may be used where only a one dimensional multiplication of images is required. In order to obtain multiple images of uniform intensity it is still necessary to compensate for the slope of curve 28 in graph (b) of FIG. 4.

It is to be noted that the terms multiplication, multiply (verb), multiply (adverb) and multiple are used herein to denote "act of increasing in number," "to increase in number," "in the manner of a multiple," and "more than one" respectively and are not used in a rigorous mathematical sense.

While it has been simpler to discuss theoretical details assuming a point source of illumination at infinity, correction for the unwanted intensity variations must deal with illumination in the practical instance. Thus the illumination source is taken as aperture 14 for the remaining graphs (c) through (g) of FIG. 4. Aperture 14 is selected of a size related to the grating period so that the aperture appears as multiple abutting images in the image plane. Like graph (a) and graph (b), graph (c) represents the intensity distribution along a line bisecting the image plane. With the multiple aperture images abutting one another, the intensity distribution graph takes on the step form illustrated in graph (c). It will be noted that the limiting envelope 28 is still the same as in graph (b). Now compensation for the slope of the limiting envelope can be obtained by filtering. A suitable filter can be made from a photograph of the aperture images. The negative of this pattern will have the characteristics illustrated by graph (d). For example, to make such a filter in the system of FIG. 3, aperture 14 of object frame 12 would be left open with the object pattern removed and photographic film with a good linear portion in its Density vs. Log Exposure curve would be positioned as photosensitive member 31 in the image plane.

In making this filter, exposure should be controlled so that only the amount of light at the apex of the central maximum or zero order diffraction carries the exposure beyond the linear portion of the Density vs. Log Exposure curve at the over exposure end. Graph (d) in FIG. 4 represents the density across the photographic negative exposed as described above. This negative will have an array of dark areas representing the diffraction orders increasing in density toward the center. In graph (d) stepped line 35 represents density and curve 36 shows the envelope characteristic of stepped line 35. With the diffraction characteristics represented in FIG. 4, the critical areas where accurate density control is required fall between .5 and 2.5 density units. Photographic film is available with a fairly linear characteristic between these points.

With a filter, produced photographically as above, positioned immediately in front of the image plane, the grating diffraction pattern in the image plane will have the intensity characteristics of graph (e) in FIG. 4. It can be noted that apex 37 of the zero order diffraction still rises above the rest of the intensity curve. Correction for this is most easily obtained by additional filtering. This can be done by positioning a further filter with a darkened area 38 in the center of final filter 32 (FIG. 8). Area 38 in a simple embodiment is opaque. The effect of this is graphically shown in graphs (f) and (g) of FIG. 4. Graph (f) shows the filter characteristics of the further filter and graph (g) shows the intensity characteristic of the diffraction pattern with an opaque dot as darkened area 38 in the further filter. As can be seen in graph 4 (g), the images as represented by curve 27 will all be of equal intensity after the final filter. With area 38 opaque, the central and sometimes one or two of the adjacent diffraction orders are lost leaving a hole in the repetition pattern. However, by careful choice of a non-opaque filter for area 38 it is possible to produce a complete pattern with no undesirable intensity variations out to several diffraction orders. The number of diffraction orders that can be utilized depends on the available light intensity and the quality of the optical system.

FIG. 8 depicts the photographic filter described above with the opaque dot 38 in the center. Any kind of graded density filter having the characteristics of envelope curve 36 in FIG. 4 (d) will serve the same purpose equally well.

The present invention is particularly useful when the multiple images should appear set apart from each other in abutting polygonal blocks. This is of use in making masks for etching solid state devices and monolithic circuits. In the manufacture of solid state devices, the block lines would serve as a guide for cutting. In monolithic circuits the block lines could serve to isolate separate identical circuit elements.

The size and shape of the block is determined by the aperture carrying the object pattern.

In the configuration illustrated in FIG. 3, with the object at the principal focus of the first lens, the separation between the blocks in the final images can be determined by the relation $$D = \frac{f\lambda}{d}$$

where D is the center to center spacing of the blocks in the final images, f is the focal length of the second lens, λ is the wavelength of the source radiation and d is the center to center spacing of the grating variations, all in centimeters.

It is apparent from this that the block spacing can be varied to any predetermined degree by changing the grating to one having variation spacings to give the predetermined D in the above equation. This gives one specific example that is useful when it is not desired to vary the image size. Other configurations, in which the object is not at the principal focus of the first lens, permit variation in spacing of the image blocks by magnification and by moving the grating portion as has been previously stated.

For some purposes radiation outside of the visible spectrum can be used. For example, if the photosensitive medium is infrared sensitive or ultraviolet sensitive, it may be desirable to use radiation in these wavelengths. It is also contemplated that the inventive system be combined with further optical systems for image display purposes. For example, a projection lens with or without a light amplifying device may be added for a greatly magnified display.

While the invention has been described in connection with specific embodiments, this is not intended to be limiting but it is intended to cover the invention broadly within the spirit and scope of the following claims.

What is claimed is:

1. Optical apparatus for producing a plurality of images of a single object comprising:
   (a) means to support an object to receive illumination from a quasi-monochromatic radiation source;
   (b) a first optical system for collecting radiation from an object supported by said means to support;
   (c) a diffraction grating comprising periodic dimensionally-dissimilar optical variations positioned in the optical path following said first optical system for preventing the formation of a diffraction pattern due to repeated optical variations of substantially the same dimensions; and
   (d) a second optical system for forming in an image plane a real image of said object for each of a plurality of the diffraction maxima of said diffraction grating.

2. Optical apparatus according to claim 1 in which said means to support an object pattern is spaced from said first optical system by one focal length so that said first optical system collimates the light from said object.

3. Optical apparatus according to claim 2 in which said grating is sandwiched in immediate adjacency between said first optical system and said second optical system.

4. Optical apparatus according to claim 1 in which the dimensionally-dissimilar variations comprise variations varying between small variations that are large compared to the wavelength of the radiation from said source and large variations that are small compared to the period of said grating.

5. An optical system for forming a plurality of identical replicas from a single object pattern comprising in sequence along an optical path:
(a) a quasi-monochromatic light source;
(b) a support frame for positioning said object pattern for illumination by said source;
(c) a collimating lens for collecting light corresponding to said object pattern;
(d) a diffraction grating following said lens for receiving at each point light representing the entire object pattern and for deviating some of the energy representative of said object pattern along paths of propagation determined by the diffraction orders of said grating;
(e) an imaging lens arranged to bring to a focus a real image of said object pattern at each of a plurality of zones in an image plane representative respectively of different diffraction orders of said grating; and
(f) means to position a photosensitive member at said image plane for receiving the impressions of said image.

6. Optical apparatus for multiplying images comprising:
(a) a quasi-monochromatic light source;
(b) means to support an object pattern for illumination by said source;
(c) a first lens for collecting illumination from said object pattern;
(d) a diffraction grating comprising periodic dimensionally-dissimilar optical variations positioned in the optical path following said first lens;
(e) a second lens for forming in an image plane a real image of said object pattern for each of a finite number of diffraction orders of said grating; and
(f) a filter varying in transmissivity as a function of location therein positioned adjacent to said image plane for correcting the aerial variations in intensity of the images so formed.

7. Optical apparatus according to claim 6 in which said filter is formed by exposing photographic film at the image plane of said apparatus with the object pattern removed and developing the negative as the filter element.

8. Optical apparatus according to claim 7 in which said filter includes an opaque area in the center to remove the zero order image.

9. Optical apparatus according to claim 6 in which said filter is a tapered density filter with an opaque center for filtering out the zero order image.

10. Optical apparatus for producing a plurality of images of a single object comprising sequentially along an optical path:
(a) means to support an object to receive illumination from a quasi-monochromatic radiation source;
(b) a first optical system for collecting radiation from an object supported by said means to support;
(c) a diffraction grating comprising periodic discontinuities for receiving at each discontinuity illumination representing the entire object pattern, said discontinuities dimensioned and spaced to prevent gross intensity variations between a plurality of the diffraction orders produced by said grating upon illumination by said source; and
(d) a second optical system for forming in an image plane, a real image of said object for each of a plurality of the diffraction maxima of said grating.

11. An optical system for projecting from a single object pattern a plurality of size to size images comprising in sequence along an optical path:
(a) a light source;
(b) a filter narrowing the output spectrum of said source to quasi-monochromatic light;
(c) an object support frame;
(d) a first converging lens spaced one focal length from said frame;
(e) a diffraction grating of periodic dimensionally-dissimilar optical variations immediately adjacent to said first lens;
(f) a second converging lens immediately adjacent to said grating;
(g) a negative of the diffraction pattern of said grating positioned substantially one focal length from said second lens as a final filter; and
(h) a photosensitive medium positioned in an image plane one focal length from said second lens and immediately adjacent to said negative.

12. An optical system to make etching masks for mass production of solid state devices comprising in sequence along an optical path:
(a) an object support frame to hold a transparency of a solid state block design for illumination by a quasi-monochromatic light source;
(b) a first lens system for collecting the light from said transparency;
(c) a diffraction grating for dividing said light among a plurality of propagation paths defined by the period of said grating;
(d) a second lens system for bringing to focus in an image plane an image of said object for each of said propagation paths;
(e) a filter adjacent to said image plane for correcting gross intensity variations between images focused along each of said propagation paths; and
(f) means to support a photosensitive medium adapted for use as an etching mask in said image plane.

13. Optical apparatus for producing a plurality of images of a single object, comprising a source of quasi monochromatic radiation, means to support said object when present to modulate radiation from said source, diffraction grating means in the path of radiation following such modulation, said grating means comprising periodic optical variations spatially distributed in at least one dimension transversed to said path, optical means to cause each of said variations to be illuminated with radiation containing substantially the entire modulation information content due to said object, and optical means for forming in an image plane a real image of said single object for each of a plurality of the diffraction maxima of said diffraction grating means.

14. Optical apparatus according to claim 13 in which said periodic optical variations are dimensionally dissimilar, for preventing the production of a second diffraction pattern forming a limiting envelope on said diffraction maxima.

References Cited by the Examiner
UNITED STATES PATENTS
3,104,586  9/1963  Laloe _____ 88—24

NORTON ANSHER, *Primary Examiner.*

R. A. WINTERCORN, *Assistant Examiner.*